United States Patent [19]
Premiski et al.

[11] Patent Number: 5,584,585
[45] Date of Patent: Dec. 17, 1996

[54] AXIAL BEARING HAVING AN ADJOINING SEAL

[75] Inventors: Vladimir Premiski, Zuelpenich-Buervenich; Wilhelm Wehren, Kerpen-Blatzheim; Mark Silk, Cologne, all of Germany

[73] Assignee: Ford Motor Company, Dearborn, Mich.

[21] Appl. No.: 553,789

[22] Filed: Oct. 23, 1995

[30] Foreign Application Priority Data

Oct. 31, 1994 [DE] Germany ............... 44 38 957.4

[51] Int. Cl.⁶ ............... F16C 33/76; F16C 33/58
[52] U.S. Cl. ............... 384/607; 384/615; 384/622; 384/620
[58] Field of Search ............... 384/590, 607, 384/611, 615, 618, 620, 622

[56] References Cited

U.S. PATENT DOCUMENTS

| | | | |
|---|---|---|---|
| 3,934,956 | 1/1976 | Pitner | 384/620 X |
| 4,566,812 | 1/1986 | Takei et al. | 384/607 X |
| 4,925,323 | 5/1990 | Lederman | 384/607 |
| 4,958,947 | 9/1990 | Peter et al. | 384/611 X |
| 5,110,223 | 5/1992 | Koch et al. | 384/620 |

FOREIGN PATENT DOCUMENTS 1327643 4/1963 France.
1575691 7/1971 Germany.

*Primary Examiner*—Thomas R. Hannon
*Attorney, Agent, or Firm*—Frank G. McKenzie

[57] ABSTRACT

In an axial bearing with an adjoining seal between two members, which form contact surfaces for the rolling elements (2) of the bearing, which are held by a cage (1, 15), one of the two members is formed by a thrust washer (4, 14, 18) for the rolling elements (2), which is integrated as a part of the bearing assembly and is provided at a central centering opening (7) with a conical seating surface (8) through which the thrust washer can be resiliently loaded radially by a sliding surface (11) of complementary shape to provide a radial seal.

9 Claims, 2 Drawing Sheets

AXIAL BEARING HAVING AN ADJOINING SEAL

BACKGROUND OF THE INVENTION

1. Technical Field

The invention relates to the field of axial bearings having an adjoining seal between two members, which form contact surfaces for the rolling elements of the bearing, held by means of a cage.

2. Description of the Prior Art

In an axial bearing of this kind, known from FRA 1327643, the cage consists of a plastic material suitable for sealing the space between the contact surfaces of the adjacent members, which receive the rolling elements, and is provided, radially outside the rolling elements, with elastic sealing lips, which are oriented axially at the circumference of the cage and bear sealingly on the contact surfaces of the members. The members are integral thrust washers of the axial bearing, which is a needle bearing, and these thrust washers can also be arranged to mutually overlap at their outer rim in order to obtain, in the region of this overlap, a supplementary labyrinth seal for the space receiving the rolling elements.

A similar form of bearing with a corresponding seal is also known from DEA 1575691. In this case, the rolling elements, which are held by means of the cage, which similarly acts as a sealing element, can also be in the form of balls or tapered rollers.

SUMMARY OF THE INVENTION

It is an object of the invention to provide an axial bearing of the abovementioned kind having a seal located radially with respect to the common axis of the bearing and the adjacent members, the seal being independent of the cage holding the rolling elements of the bearing.

With this object in view, in an axial bearing having an adjoining seal located between two members which form contact surfaces for the rolling elements held by means of a cage, one of the two members is an axial thrust washer for the rolling elements, which washer is integrated as a part of the bearing assembly and is provided at a central centering opening with a conical seating surface, through which the thrust washer can be resiliently loaded radially by a sliding surface of complementary shape to provide a radial seal. The sliding surface is preferably formed on a coaxial packing ring of the bearing, which is preferably provided with an external cone in order to load the seal on the conical seating surface, which is then advantageously formed as an internal cone of a clamping collar in the middle of the thrust washer.

The clamping collar in the middle of the thrust washer advantageously has an axial width greater than that of the thickness of the thrust washer, and the axial width of the packing ring is advantageously somewhat less than the total width of the bearing assembly, which includes the cage, rolling elements, and thrust washer. The internal cone of the clamping collar of the thrust washer advantageously has a greater axial width than that of the external cone of the packing ring. The conical seating surface of the thrust washer is advantageously oriented at an angle of about 15° to the axis of the bearing.

In an alternative embodiment of the axial bearing in accordance with the invention, the axial thrust washer integrated as a part of the bearing assembly is also provided, at the rim of its central centering opening, with a supporting edge for the inner rim of an axially expanding Belleville spring, by means of which the bearing is axially loaded between the thrust washer and the adjacent member so as to obtain a radial seal, with the outer rim of the Belleville spring bearing on the adjacent member.

BRIEF DESCRIPTION OF THE DRAWINGS

The invention will now be described further, by way of example, with reference to several embodiments of the axial bearing shown diagrammatically in the drawings, in which.

DETAILED DESCRIPTION OF PREFERRED EMBODIMENTS

Figure 1:
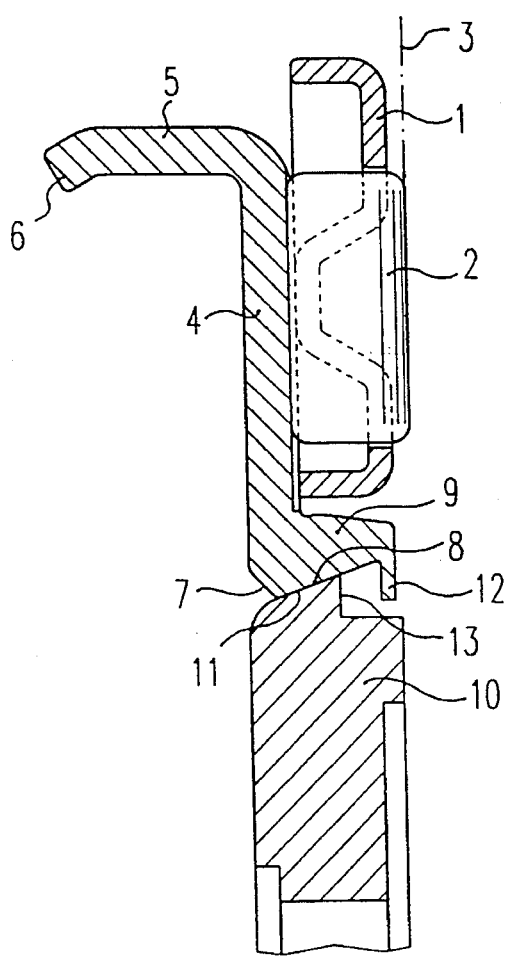
FIG. 1 is a cross section through part of an axial bearing in accordance with a first embodiment of the invention.

In the cross section through part of an axial bearing, shown diagrammatically in FIG. 1, the bearing is formed with a cage 1 and with needles in the form of cylindrical rollers 2, which are held in position by means of the cage 1. The cylindrical rollers 2 are provided for contact with contact surfaces on two adjacent members, one of which may, for example, be the planet pinion carrier of a planetary gear changeover transmission for motor vehicles on which the planet pinion is rotatably mounted, each planet pinon being supported by means of a respective axial bearing. In FIG. 1, the contact surface formed on one such first adjacent member for the cylindrical rollers 2 is indicated by the chained line 3.

The contact surface of a second adjacent member for the cylindrical rollers 2 held by the cage 1 is now formed by a thrust washer 4, which is provided, at its outer rim, on the side of the washer remote from cage 1, with an axially extending, collar-shaped extension 5, which has, at its rim side, a retaining lug 6, by means of which the thrust washer 4 would, in the application referred to above, be mounted in a retaining groove on the hub of an associated planet pinion mounted on the planet pinion carrier. The thrust washer 4 is provided at a central centering opening 7 with a conical seating surface 8, which is in the form of an internal cone of a central clamping collar 9 of the thrust washer. Through this conical seating surface 8 in the form of an internal cone, the thrust washer 4 can be loaded by a sliding surface 11 of complementary shape formed as an external cone of a coaxial packing ring 10 of the bearing, the loading of the thrust washer 4 by the packing ring 10 being effected in the axial direction at these cooperating conical surfaces 8 and 11.

For this purpose, the clamping collar 9 of the thrust washer 4 is formed to be somewhat resilient radially, with the object, on the one hand, of obtaining, at the cooperating conical surfaces 8 and 11, adequate radial sealing with respect to the bearing axis as soon as, in the installed state of the axial bearing, the thrust washer 4 has taken up its fully installed position relative to the packing ring 10. On the other hand, the radially resilient form of the clamping collar 9 fulfills the purpose of enabling the thrust washer 4 and the packing ring 10 to be joined together by means of a snap fastening to form a captive assembly unit. In the case of the embodiment shown in FIG. 1, this is realized by cooperation of a retaining lug 12 on the larger opening diameter of the internal cone 8 of the clamping collar 9 with an axially limiting stop 13, which is formed by means of a step at the circumference axially beside the sliding surface 11 of the packing ring 10. As a result of this snap connection, the thrust washer 4 can be pushed axially from left to right (in the illustration of FIG. 1) with the internal cone of its central clamping collar 9 axially over the external cone of the packing ring 10. During this axial pushing, the retaining lug 12 runs over the external cone 11 of the packing ring until, at the limiting stop 13, it drops into the step at the outer circumference of the packing ring. The internal cone of the clamping collar then bears sealingly against the external cone of the packing ring.

Figure 2:
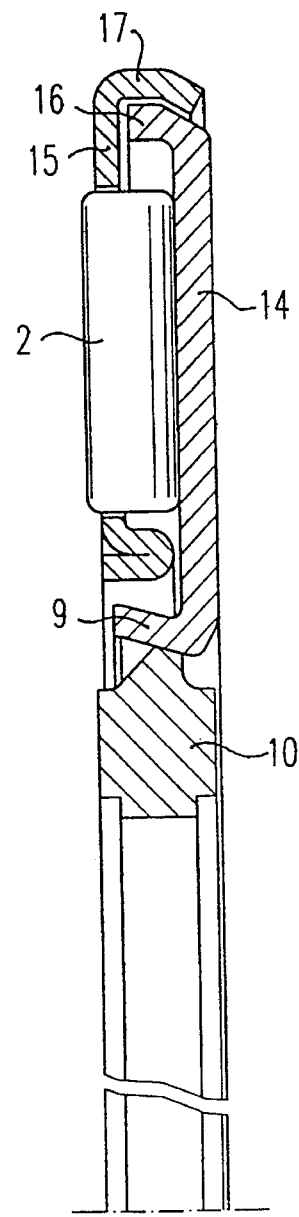
FIG. 2 is a cross section through part of an axial bearing in accordance with a second embodiment of the invention.

In the case of the modified embodiment of the axial bearing shown in FIG. 2, the outer rim of a thrust washer 14 is provided with a collar-shaped extension 16, which extends axially towards the cage 15 and is overlapped by an axially, oppositely oriented extension 17 on the outer rim of the cage 15. At the overlap of the thrust washer 14 and the cage 15 at the rim, a kind of labyrinth seal is thus produced, by means of which the bearing space receiving the cylindrical rollers 2 is further sealed towards the outside in known manner. As shown in FIG. 2, the extension 17 may engage behind the extension 16. In addition, in this embodiment, a packing ring 10 is loaded at an external cone by the internal cone of a radially resilient clamping collar 9 with which, as in the case of the axial bearing shown in FIG. 1, the central centering opening of the thrust washer 14 is provided.

Figure 3:
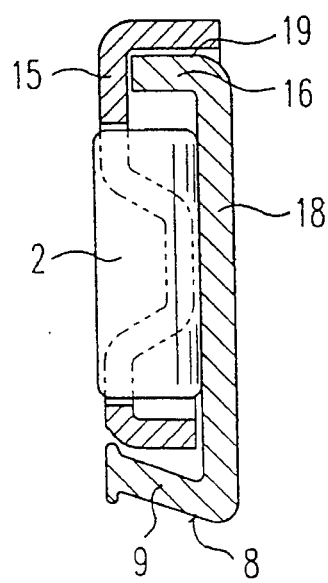
FIG. 3 is a cross section through part of an axial bearing in accordance with a third embodiment of the invention.

In the case of the further alternative embodiment of the axial bearing shown in FIG. 3, the rim of cage 15 overlaps a corresponding thrust washer, thereby providing for mutual fixing of the thrust washer and cage at several embossed positions 19, equally spaced around the circumference of the thrust washer 18. In addition, here again, the thrust washer 18 includes a central clamping collar 9 having a conical seating surface 8, which surface cooperates with a sliding surface of complementary shape to obtain a radial seal.

Figure 4:
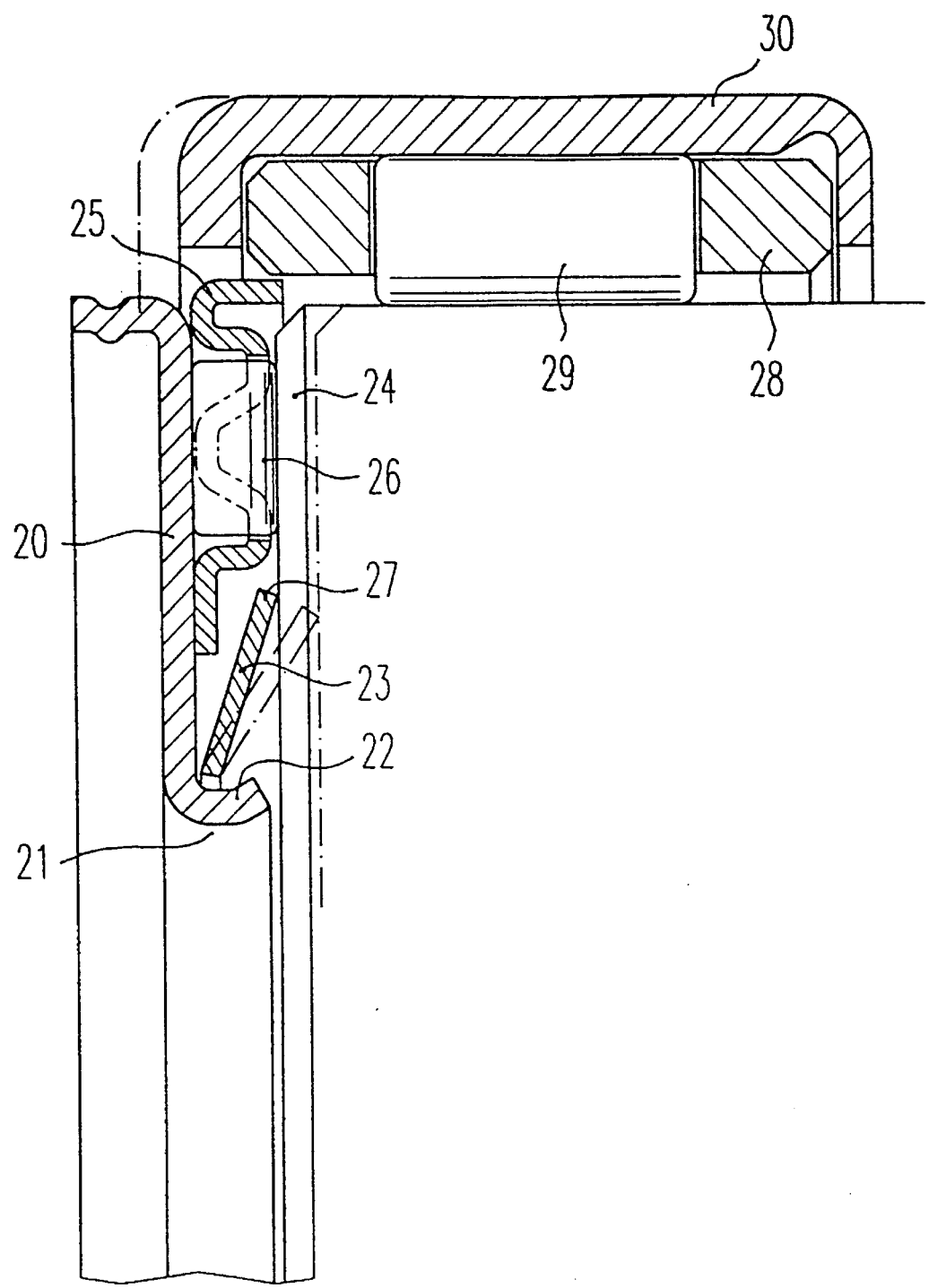
FIG. 4 is a cross section through part of an axial bearing in accordance with another embodiment of the invention than those shown in FIGS. 1 to 3, in combination with a radial bearing.

Finally, FIG. 4 shows an embodiment in which, as an alternative to the embodiments described above, a thrust washer 20 is provided at the rim of its central centering opening 2 1 with a supporting edge 22 for the inner rim of an axially expanding Belleville spring 23, by means of which the bearing is loaded axially between the thrust washer 20 and the adjacent member 24, which forms the opposite contact surface to the thrust washer for the cylindrical rollers 26, which here are again held by means of a cage 25. The Belleville spring 23 is supported at its inner rim on the bent-over supporting edge 22 in such a way that, when the Belleville spring is axially loaded, a radial seal is obtained by its outer rim 27 bearing on the member 24. For the outer rim 27 of the Belleville spring 23, two relative positions are shown in FIG. 4, of which the steeper relative position shows the final installed position, i.e., the position in which the cylindrical rollers 26 of the axial bearing bear on the contact surfaces of the thrust washer 20 and on the member 24.

In addition, FIG. 4 also shows a radial bearing having a cage 28 for cylindrical rollers 29, which run on the circumferential surface of the member 24, shown as a shaft. This radial bearing is completed by an outer thrust ring 30.

What is claimed is:
1. An axial bearing, comprising:
rolling elements;
a cage containing the rolling elements;
a thrust washer located at a first axial side of the rolling elements, having a central centering opening, and a conical seating surface inclined radially and axially and located at said opening; and a ring having a surface whose shape is complementary to the shape of the seating surface and contacts the seating surface, the seating surface of the thrust washer being resiliently loaded radially on said surface of the ring surface due to axial movement relative to said ring, thereby providing a radial seal therebetween.

2. The axial bearing according to claim 1, wherein the thrust washer (4, 14, 18) has an axial thickness and a central opening, the thrust washer further comprising a clamping collar (9) having an axial width greater than the axial thickness of the thrust washer and a internal conical surface located at the central opening.

3. The axial bearing according to claim 1, wherein the cage (1, 15), rolling elements (2), and thrust washer (4, 14, 18) have a total axial width, and said ring has an axial width that is less than said total axial width.

4. The axial bearing according to claim 1, wherein:
the thrust washer (4, 14, 18) further comprises a retaining ring (12) located at the conical seating surface (8) extending toward the seating surface; and
said ring (10) comprises an axially limiting stop (13) on the sliding surface (11) located for contact with the retaining ring, whereby movement of the thrust washer relative to the ring is limited by contact the retaining ring and limiting stop.

5. The axial bearing according to claim 1, wherein the bearing has a longitudinal axis, and the conical seating surface (8) of the thrust washer (4, 14, 18) is inclined with respect to said axis at a conical angle of about 15 degrees.

6. The axial bearing according to claim 5, wherein:
the outer rim of the thrust washer (14, 18) comprises a first extension (16) extending axially towards the cage (15); and
the cage includes an outer rim having an second extension (17) directed axially toward the thrust washer and overlapping ther first extension, thereby forming a labyrinth seal between the first and second extensions.

7. The axial bearing according to claim 1, wherein the thrust washer (4) includes an outer rim located on the side of the thrust washer remote from said cage (1), said rim having an axially extending extension (5, 6) adapted to fix the thrust washer an adjacent member.

8. The axial bearing according to claim 7, wherein the extension (5) has a retaining lug (6) resiliently engageable with the adjacent member.

9. An axial bearing, comprising:
rolling elements (26);
a cage (25) containing the rolling elements;
a thrust washer (20) located at a first axial side of the rolling elements (26), having a central centering opening (21) having a supporting edge (22);
an adjacent member (24) located at a second axial side of the rolling elements opposite the location of the thrust washer; and
an axially expanding Belleville spring (23) having an inner rim supported on the supporting edge, the spring resiliently loaded axially between the thrust washer (20) and the adjacent member (24), whereby a radial seal is produced by the outer rim (27) of the Belleville spring (23) bearing on the adjacent member (24).

\* \* \* \* \*